(12) United States Patent
Green et al.

(10) Patent No.: US 6,249,750 B1
(45) Date of Patent: Jun. 19, 2001

(54) PHASE DETECTOR

(75) Inventors: Thomas David Green, deceased, late of Warks, by Peter Ronald Burton, executor; Janko Mrsic-Flogel, London, both of (GB); Zorislav Sojat, Zagreb (HR)

(73) Assignee: Symmetricom, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,024

(22) Filed: Feb. 2, 1998

(30) Foreign Application Priority Data

Feb. 3, 1997 (GB) .................................................. 9702129

(51) Int. Cl.$^7$ ............................. G06F 19/00; G01R 21/00
(52) U.S. Cl. ........................................... 702/72; 324/76.77
(58) Field of Search .................................. 702/71, 72, 75, 702/76, 78, 79, 125, 189, 197, FOR 107, 108, 109, 110; 375/226, 375; 324/76.77, 76.82; 327/2, 7, 9; 968/847

(56) References Cited

U.S. PATENT DOCUMENTS

| | | | |
|---|---|---|---|
| 4,311,962 | * 1/1982 | Titsworth | 328/120 |
| 4,707,839 | * 11/1987 | Andren et al. | 375/1 |
| 4,821,294 | 4/1989 | Thomas, Jr. | 375/96 |
| 4,884,020 | * 11/1989 | Blakeslee | 324/76.82 |
| 5,101,416 | 3/1992 | Fenton et al. | 375/1 |
| 5,559,841 | * 9/1996 | Pandula | 375/375 |
| 5,990,673 | * 1/1996 | Forsberg | 324/76.62 |

FOREIGN PATENT DOCUMENTS

| | | | |
|---|---|---|---|
| 0 508 621 A1 | 10/1992 | (EP) | G01S/5/02 |
| 0 602 249 A1 | 6/1994 | (EP) | H04L/7/08 |
| 0 605 188 A2 | 6/1994 | (EP) | H04Q/11/04 |
| 2 168 224 | 6/1986 | (GB) | H04L/7/04 |
| 2 276 797 | 5/1994 | (GB) | H04L/7/04 |
| 2 297 229 | 7/1996 | (GB) | G01S/1/04 |
| WO93/07690 | 4/1993 | (WO) | H04J/3/06 |

OTHER PUBLICATIONS

Robert C. Dixon et al., "Spread Spectrum Systems–With Commercial Applications", Third Edition Chapter 6; pp. 177–215.
ED FF. Mazada; "Electronic Engineers Reference Book", sixth edition, ISBN 0 7506 08099; PP. 38/8–38/12.

* cited by examiner

*Primary Examiner*—Patrick Assouad
*Assistant Examiner*—Manuel Barbee
(74) *Attorney, Agent, or Firm*—Kilpatrick Stockton LLP

(57) ABSTRACT

Apparatus for measuring the phase of a predetermined incoming data sequence comprising, sampling means operable under control of a sampling clock to sample the incoming sequence at a frequency not equal to an integer multiple or divisor of the data rate of the sequence, test means operable to record a plurality of the samples in a time-ordered sequence, reference means operable to store a copy of at least a portion of the predetermined digital data sequence, comparison means operable to compare the recorded and stored sequences over a predetermined sequence length and to locate the position of an additional or omitted sample in the recorded sequence, calculation means operable to calculate the time of sampling of the additional sample or the time of sampling of the omitted sample relative to the sampling clock, and output means operable in response to the calculated time of sampling, to output a phase value indicative of the phase relative to the sampling clock, of the incoming sequence.

22 Claims, 3 Drawing Sheets

FIG. 3

PHASE DETECTOR

The present invention relates to apparatus and a method for measuring the phase of a data sequence.

Sometimes, data is transmitted in a digital format. Usually by modulating a medium with a digital data stream comprising a sequence of (not necessarily binary) symbols.

Increasingly, not only does the data sequence itself contain information but the phase of arrival of the symbols also carries information. For example, in the global positioning system (GPS), measurement of the phase of the spread spectrum symbols (so-called code phase measurements) may be used to perform a position measurement by triangulation. Also, in a mobile telephony system, such as the global system for mobile communications (GSM), a measurement may be made at a base station of the phase of a mobile station's transmissions so that the base station may instruct the mobile station to advance its timing to ensure that its transmissions fit within the allocated time division multiple access (TDMA) slot at the base station.

In order to determine the phase of a digital data sequence it is necessary to take measurements of the incoming signal. Typically such measurements take the form of a periodic amplitude measurement of the incoming signal once it has been demodulated.

Conventional wisdom (as described, for example, in Chapter 6 of "Spread Spectrum Systems—With Commercial Applications" Third edition, Robert C. Dixon, John Wiley & Sons Inc) has it that the measurement (or sampling) of the incoming sequence must occur necessarily at the same frequency as or some integer multiple of the data rate i.e. the frequency of transmissions of each symbol of the sequence. Much work has been performed on finding ways of synchronising the sampling frequency with the inherent clock frequency or data rate of the incoming sequence. However all current methods are based on a complex method and the corresponding apparatus is costly to produce.

It is an object of the present invention to provide improved apparatus and method aspects with reduced complexity.

Therefore, according to the present invention there is provided apparatus for measuring the phase of a predetermined incoming data sequence comprising, sampling means operable under control of a sampling clock to sample the incoming sequence at a frequency not equal to an integer multiple or divisor of the data rate of the sequence, test means operable to record a plurality of the samples in a time-ordered sequence, reference means operable to store a copy of at least a portion of the predetermined digital data sequence, comparison means operable to compare the recorded and stored sequences over a predetermined sequence length and to locate the position of an additional or omitted sample in the recorded sequence, calculation means operable to calculate the time of sampling of the additional sample or the time of sampling of the omitted sample relative to the sampling clock, and output means operable in response to the calculated time of sampling, to output a phase value indicative of the phase relative to the sampling clock, of the incoming sequence.

Generally, the frequency of the sampling clock $F_s$ may be given by:

$$F_s = X \cdot F_c \pm \frac{Y \cdot F_c}{(N-1)}$$

where Fc is the data rate, N is the predetermined length of comparison, X is the number of samples taken of each incoming symbol, and Y is the number of additional or omitted samples expected to be found in the sequence of N samples (when the fraction is added or subtracted respectively).

$X \cdot F_c$ is referred to below as the "integer frequency" and X is either an integer or the reciprocal of an integer i.e. 1, 2, 3, 4 etc. or ½, ⅓, ¼ etc. Thus when X=1, one sample per symbol will be taken for most symbols, but because $F_s$ does not exactly equal $F_c$ since it is different by $$\pm \frac{Y \cdot F_c}{(N-1)}$$

not all symbols will be sampled once. Similarly, when X=2 not all symbols will be sampled twice and when X=½ mostly alternate symbols will be sampled but occasionally consecutive symbols or every third symbol will be sampled when $F_s$ is greater or less than the integer frequency respectively.

Similarly $$\frac{Y \cdot F_c}{(N-1)}$$

is referred to below as the integer fraction, with Y taking values of 1, 2, 3 and ½, ⅓, ¼ etc. (referred to below as an integer or an integer ratio) so that the accuracy of the system can be improved by offsetting the phase of the received signal to ensure that the extra bit occurs within the length of the correlation register using a phase control on the sampling clock. In this way, the extra bit/s may be forced to occur within N samples from any given instant. This is described in more detail below.

By choosing to sample the incoming digital data sequence at a frequency not equal to the integer frequency of the data rate of the sequence, over time, if the sampling frequency is greater than the integer frequency, eventually one of the symbols will be sampled once more than the adjacent symbols. Similarly, where the sampling frequency is less than the integer frequency, one of the symbols will be sampled less frequently than the adjacent symbols. It will be seen from the description below that the time of sampling of the additional sample or the omitted sample occurs on an edge of the incoming sequence. Thus, by calculating the time of sampling of the additional sample or the time of sampling of the omitted sample, the time of arrival of an edge of the duplicated or omitted sample may be calculated and thus the phase of the complete sequence found in relation to the phase of the sampling clock.

Preferably the test means includes a test shift register operable to shift each successive sample received from the sampling means into the register, wherein the reference means include a register containing the said predetermined digital data sequence, and wherein the comparison means include correlating means operable to perform a multiplication operation on pairs of symbols stored in corresponding positions in the two registers and to sum the result over the length of the test register. In this case, the calculation means may be operable to calculate the product of the sampling period and a value representative of the said summed result to determine the calculated time of sampling in relation to the time of sampling of the first and/or last sample in the test register.

By arranging for the reference means to include a reference shift register operable to shift in the same and in a direction opposite to the test register, additional tests may be made during each sampling period. Preferably the reference shift register is operable to shift at a frequency the same as or greater than the sampling frequency. This is advantageous since the greater the shift frequency, the more comparisons may be made within a sampling period. The results may then be averaged.

Preferably the calculation means is arranged to calculate the time of sampling relative to an external timing reference such as a GPS 1PPS signal. Thus, using a common time reference between a transmitter and a receiver, a distance measurement may be made and triangulation may be used (using several such measurements from different receivers) to perform a position determination.

According to a method aspect of the invention, a method of measuring the phase of an incoming predetermined sequence comprises sampling the incoming sequence under control of a sampling clock at a frequency not equal to an integer multiple or divisor of the data rate of the sequence, recording a plurality of the samples in a time-ordered sequence, comparing the recorded sequence with a local copy of at least a portion of the predetermined data sequence and locating the position in the time-ordered sequence of an additional or omitted sample, and calculating the time of sampling of the additional sample or the time of sampling of the omitted sample and outputting in response to the calculated time of sampling a phase value indicative of the phase relative to the sampling clock, of the incoming sequence.

The method includes preferred features corresponding to the apparatus aspect.

The invention will now be described by way of example with reference to the Figures in which:

FIG. 3 is a schematic diagram of the shift registers of FIG. 2.

In this example, X=Y=1 and the fractional portion of the general equation is added.

Figure 1:
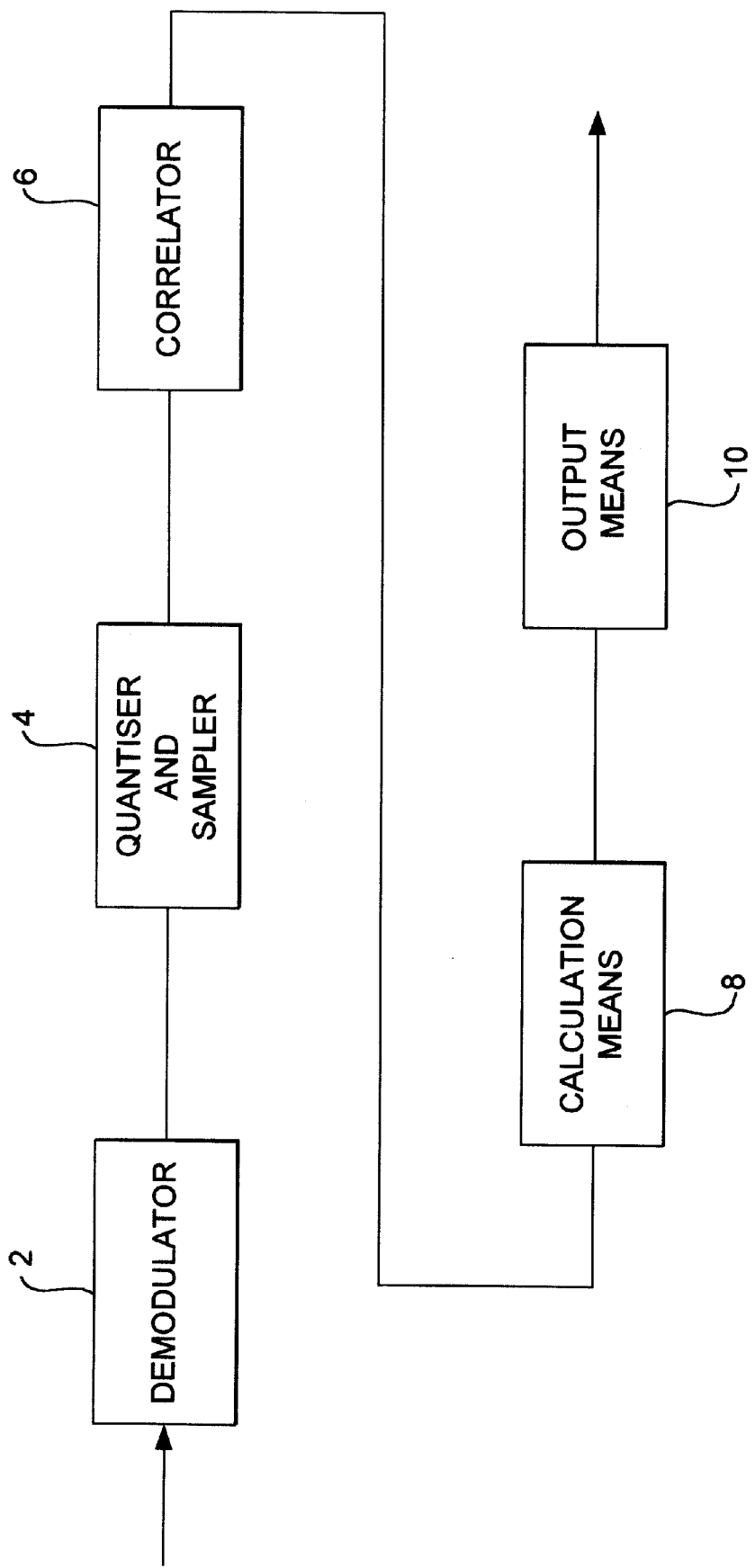
FIG. 1 is a schematic block diagram of apparatus in accordance with the invention.

With reference to FIG. 1, a signal, for example, a radio signal modulated with a digital data sequence arrives at demodulator 2. The demodulated data stream is then passed to quantiser and sampling means 4. It should be appreciated that the data sequence may, for example, be an analogue signal such as a sine waveform.

A frequency-modulation receiver with quantiser suitable for this application is given in "Electronic Engineers reference Book" Ed FF Mazda, 6th ED ISBN 0 7506 08099 and similar textbooks. The data is quantized using standard analogue to digital techniques, at the instants defined by $F_s$. This book describes how to build and operate blocks 2 and 4 of FIG. 1.

The sampled data sequence is then passed to correlator 6, the operation of which is described in detail below. Briefly, however, the correlator 6 operates to store a local copy in a time ordered sequence of at least a portion of the data sequence which it is expected to be received. It also records a plurality of the samples (i.e. the quantised values produced by the quantiser 4) of the actual incoming data sequence. Due to the timing of sampling used in this example (which is described below), it is expected that the sampled incoming data sequence will have a duplicated bit in the sequence. The correlator operates to locate the position of any duplicated bit in the sequence of recorded samples. This position information is passed to calculation means 8 which operates to calculate the time of sampling of the duplicated bit.

Finally, output means 10 outputs the calculated time of sampling as the time of arrival of an edge of the duplicated bit.

The calculation means 8 and output means 10 are typically embodied in software in a digital signal processing (DSP) system.

Figure 2:
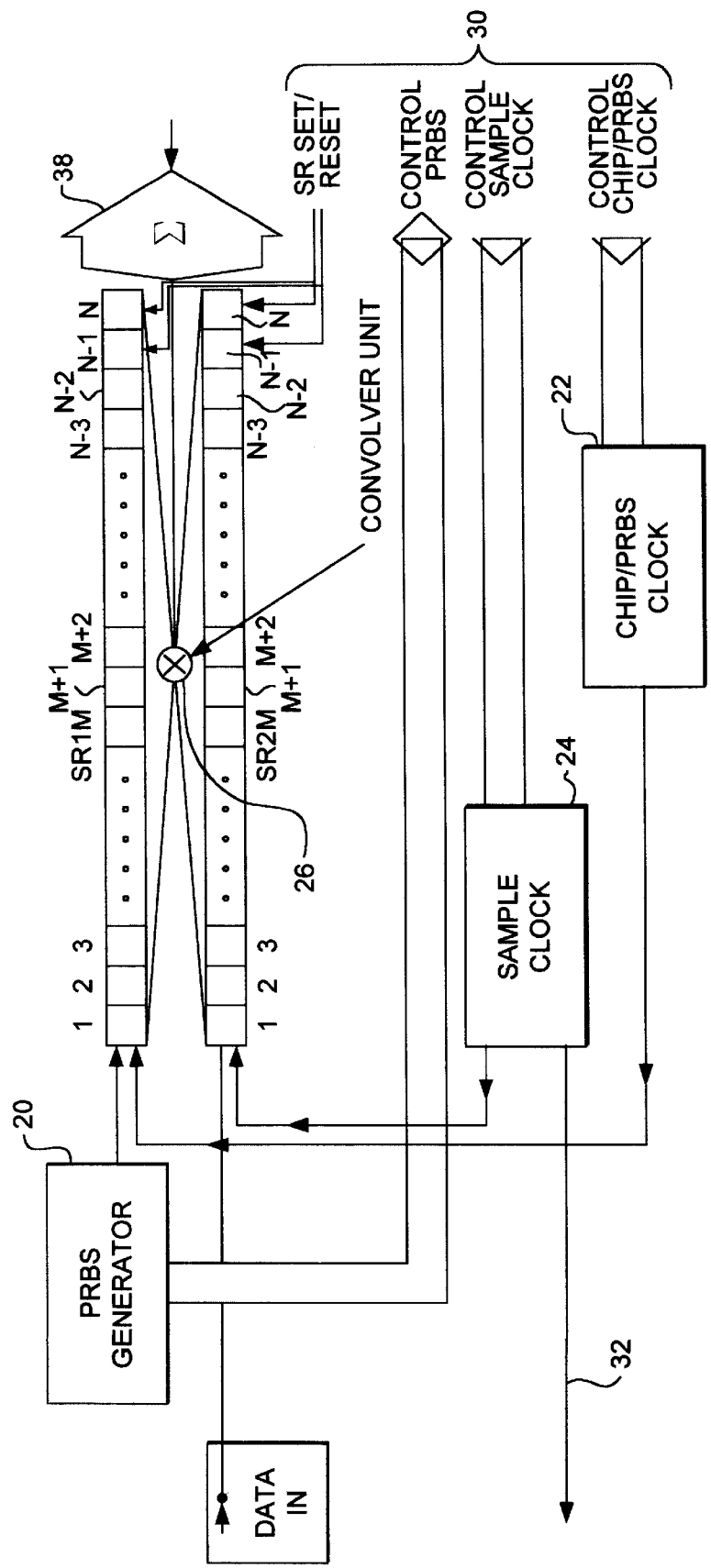
FIG. 2 is a schematic block diagram of the correlator of FIG. 1.

With reference to FIG. 2, the correlator 6 includes a pseudo random bit stream (PRBS) generator 20 which is operable to feed bits in sequence into reference register SR1.

An identical test register SR2 is fed with data from the quantiser and sampling means 4.

The registers SR1 and SR2 are binary shift registers having N positions and may for example be made from flip-flops. The registers SR1, SR2 are clocked separately by a chip/PRBS clock 22 and a sample clock 24 respectively. The registers SR1, SR2 also have separate respective set and reset lines and may advantageously be loadable directly with an N-bit word obviating the need to shift the word in from one end.

The locations are numbered in the figure 1, 2, 3 . . . N. Also marked is an arbitrary location M within the two registers with subsequent locations marked M+1, M+2 . . . M+P where M+P=N.

A convolver 26 is operable to compare each of the bits in corresponding locations in the shift registers SR1, SR2.

In this example, the comparison between each of the bits is performed by performing an XNOR (equivalent to AND) and an XOR logical operation between corresponding bits in the shift registers SR1, SR2. The XNOR operation produces a set bit in positions which have matching data and the XOR operation produces a result having set bits in the positions where the data do not match.

The output of the convolver 26 for each of the shift register positions is summed by summer 28. The summer counts the number of set bits resulting from the XNOR and XOR operations and subtracts the sum of set bits resulting from the XOR operation from the sum of set bits resulting from the XNOR operation. Thus the summer 28 is subtracting the number of non-matching locations from the number of matching locations.

In the non-correlated portions of the shift registers, noise will tend to produce equal numbers of correlating and non correlating positions. These will cancel out and the output of the summer 28 is therefore a count of the number of matching positions which do not result from noise and it should therefore represent a count of the number of a truly correlated portion of the sequences in the shift registers SR1, SR2.

Conceptually, the convolver and summer perform a multiplication and addition operation where 0 represents −1 and 1 represents 1.

The sample clock 24, chip/PRBS clock 22, PRBS generator 20 and shift register set/reset lines are controlled by a microprocessor (not shown) via control lines 30.

The sample clock is also fed via line 32 to the quantising and sampling means 4. As each sample is taken it is clocked into position 1 of the test register SR2.

The sample clock 24 is a numerically controlled oscillator or signal generator controlled by the microprocessor and has accurate phase and frequency settings. Typically the frequency setting may be set to an accuracy of less an 1 Hz and the phase to an accuracy of 10° to 45° for a system expected to operate on a sequence having a data rate of 100 MHz. These figures are given by way of guidance only since the invention is generally applicable. Advances in device technology will allow greater choice of these parameters.

The sample clock frequency $F_s$ is deliberately made greater than the chip rate $F_c$. In the preferred embodiment, the shift registers SR1, SR2 are one location longer than the PRBS and $F_s$ is greater than $F_c$ by the ratio of the length of the registers SR1, SR2 to the length of the sequence i.e. by N/N−1. In terms of the general equation given above, X=1, Y=1 and N is the PRBS sequence length plus one.

Considering the chip period and sample period $T_c$ and $T_q$ it will be appreciated that the sampling period is very slightly shorter than the chip period. Thus, a single sample will be taken during every chip period but at some point two samples will be taken in the same chip period.

Therefore, when comparing the sampled sequence in register SR2 with the expected sequence in register SR1, it will appear that an extra bit has been inserted into the recorded sequence.

In the preferred embodiment using a PRBS, the PRBS is chosen so that convolution in the correlator 6 has the following properties:
1. Convolution of the sequence with any sequence other than itself produces another pseudo random sequence.
2. Convolution of the sequence with any regular pattern produces another pseudo random sequence.
3. convolution of the sequence with a fixed level produces another pseudo random sequence.
4. Convolution of the sequence with itself produces a strong correlation when the sequence matches and another pseudo random sequence otherwise.

These properties are widely known for PRBSs. When passed through the correlator 6, on average the output from the summer will be zero where the registers contain non-matching random sequences. However, when the sequences match, the output of the summer 28 will be a value whose magnitude varies according to the number of locations which match.

The important properties of a sequence (not necessarily a PRBS) for this invention are that non-correlating data can be processed to produce an approximately zero average output and correlating locations can be processed to produce a value having a magnitude related to the number of correlated positions.

Considering again how the data is sampled in accordance with the invention, it will be appreciated that the sampled sequence may match in two positions since the sequence is effectively divided into two by the extra bit introduced by the sampling method employed. Because of the extra bit, the data shifted into the test register SR2 after the extra bit, is delayed by one sampling period and thus if a match occurs with the reference register SR1 with the sampled bits preceding the extra bit, a match cannot occur with the bits sampled after the extra bit. Similarly, when the next bit is sampled and the data in test register SR2 is shifted by one location, the sampled bits in advance of the extra bit are now advanced in time by one sampling period in relation to the sequence held in the reference register SR1 and therefore no longer match. However, the bits sampled after the extra bit now match. This is shown diagrammatically in FIG. 3.

Figure 3:
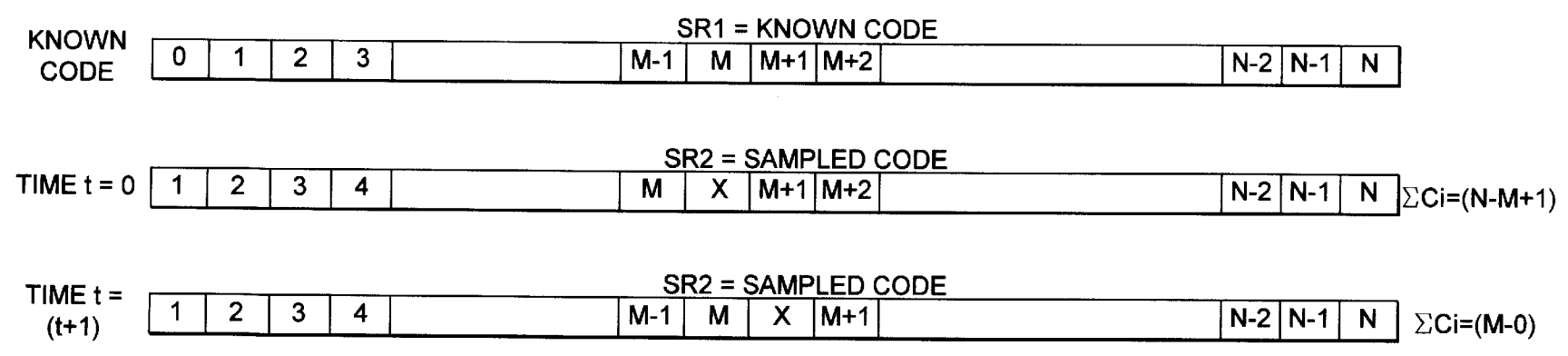

With reference to FIG. 3, the known code or sequence is placed in SR1. During correlation, the data is shifted in tester register SR2 from left to right in the figure. An extra bit X has been introduced into the sampled sequence held in the test register SR2. At time t=0 the samples taken before the extra bit (M+1 . . . N) are correlated with the reference register. Up until this point, the output from the summer 28 has been close to 0. In theory, for an infinite length shift register having an even number of locations, the output will equal 0. However, in practice, since the received signal is noisy and the register is of finite length, the output of the summer will generally hover about 0 within a predetermined, precalculable threshold.

When a portion of the two registers matches, a marked rise in the output of the summer 28 will occur. In the figure, it will be seen that at time t=0 (and assuming that noise has not corrupted the received signal) the samples in positions M+1 to N match. Thus by inspection, the convolver will output a sequence of (N−(M+1)) ones. The portion of the register before the extra bit i.e 1 to M should sum to approximately 0 because it is a random sequence which does not match with the known codes stored in register SR1. Thus the output of the summer equals N−(M+1) i.e. N−M−1.

At time t=(t+1) the values in the register SR2 have been shifted and now it is the locations 1 to M which match the data in the corresponding locations of register SR1. Thus, the output of the summer is now equal to M.

It will now be appreciated that correlation of part of the sequence can be detected by seeing a marked increase in the value output from the summer 28. Additionally, the actual value provides an indication of the position along register SR2 at which the extra bit occurs. At time t=0, the value is equal to all the locations on the right hand side which are adjacent the extra bit and similarly at time t=t+1 the output of the summer 28 is equal to the number of locations to the left of the extra bit (as shown in the Figure).

Thus, since the sampling clock is under control of the receiver it is possible to determine the time of sampling of each of the sampled values in register SR2 and either to count back from the right hand side of the register (at the first correlation) or forward from the left band side of the register (at the second correlation).

By calculating the time of arrival of the extra bit, the time of arrival of the trailing edge of the chip which was sampled twice is calculated. One particular method of calculation is described below.

It will be appreciated that the calculation of the timing of trailing edge of the twice-sampled chip is accurate in this example, to within the difference between the sampling and chip periods i.e. $T_c - T_s$.

As stated above, the sampling frequency is arranged so that one extra bit appears in the register i.e. so that it is higher than the chip frequency by the ratio of the register length N to the sequence length N−1. Thus taking reciprocals, $T_s = T_c(N-1/N)$. Therefore substituting for $T_s$ in $T_c - T_s$, the accuracy of the edge measurement is equal to $T_c(1-(N-1/N))$. Since N−1/N tends to one as N increases, it will be appreciated that the error of the edge measure decreases with increasing N i.e. $T_c - T_s$ becomes smaller with increasing N. For this reason, more accuracy may be obtained by increasing the length of the registers SR1, SR2. However, it will be appreciated that the phase and frequency accuracy of the sampling clock is a limiting factor.

More generally, the accuracy (or resolution) is the difference between $T_c$ and $X.T_s$ where $T_c$ and $T_s$ are the reciprocals of $F_c$ and $F_s$ respectively. The resolution then becomes $$T_c\left(1 - \frac{N-1}{X(N-1) \pm Y}\right)$$

which for large N, tends to zero.

It is not known beforehand where the extra bit will appear in the test register SR2. Ideally the bit appears towards the centre of the register SR2. In this case, there is a maximum length of unmatched samples so that the sum of the convolved output tends towards zero for this portion and there is a maximum length of matched samples so that the effect of any noise corruption in the received and sampled signal is minimised. Since the position of the extra bit is known from the output of the summer, it is possible to place less dependence on the results as the summer output deviates from N/2. This may be achieved by using a weighting function which provides an accuracy measure associated with each edge measurement which is a function of the magnitude of the summer output.

There is now described one way of calculating the time of arrival of the incoming sequence. The time of arrival is related to the phase of the incoming sequence by its known frequency.

Firstly, as described above, two correlations occur and the sum of the summers output for these two correlations should equal N. the length of the sequence compared. In practice however, noise will lower the values of M and P since the incoming sequence once corrupted by noise will not exactly correlate with the expected sequence. To allow for this, values P' and M' are calculated which are N×the ratio P/(M+P) and N×the ratio M/(M+P) respectively. (As will be noted from the description above, M and P are the summer outputs at the first and second correlations). Thus effectively P' and M' are P and M normalised so that P'+M' always equals N regardless of noise.

In operation, the extra bit introduced into the sample sequence shifts through the test register. When the extra bit is in the first position of the test register, we know that the sample clock is in phase with the incoming sequence since the latest sample was taken on an edge of an incoming signal. At this time, M'=0 and P'=N. Since the extra bit shifts through the register with each sample, P' gives the number of cycles of the sample clock which are required to pass before the sample clock is again in phase with the incoming sequence. Similarly, M' gives the number of cycles of the sample clock since the sample clock was in phase.

Let us assume that the position of interest which we seek to measure is the mid point of a symbol of the incoming sequence. Since one extra bit only is inserted by the choice of sampling frequency, we know that the passage of the extra bit from one end of the test register to the other represents the slippage or passage of one cycle of the incoming sequence. We also know therefore that when the extra bit is precisely in the middle of the test register, the sample presently being taken must be being taken in the middle of a symbol (since the extra bit is in the middle of the shift register which represents the edge of the symbol).

Thus by determining when the extra bit is in the centre of the test register, we can accurately determine when a sample is being taken of the centre of a symbol. The extra bit is in the centre of the test register when M'=P'. Therefore, when the difference between M' and P' is at a minimum, it is known that the sample which has just been taken was taken at the centre of a symbol. Thus the precise phase or time of arrival of the incoming sequence is known.

It is advantageous however to be able to calculate the phase of the incoming sequence after every sample rather than only at a time when M'=P'. The phase estimates may then be averaged to improve accuracy. Since we know that P' and M' provide information about the number of sample clock cycles we must wait before phase synchronisation occurs, we may use the values M' and P' to calculate the phase difference between the sample clock and the incoming sequence. It can be shown that the expression $$\left(\frac{P' - M'}{2N}\right) \cdot T_s$$

provides (in terms of sampling periods) a time offset from the time of the most recent sample to the time at which the centre of a symbol will next be sampled. Thus after allowing for the fact that the time of the present sample advances by one sampling period at each sample, a phase estimate may be made after each sample which is normalised to give a time of arrival of the centre of a symbol.

The description above relates to an example where X=Y=1.

It will be appreciated that by increasing Y to 2, two extra bits will be introduced into the test register. In this case, there will be three positions at which portions of the sampled sequence correlate with the locally known sequence. In this case, the outputs of the summer for the second correlation position will need to be summed with either the output for the first or the third correlation position in order to determine the position of the second extra bit. Similar principles apply for even greater values of Y.

It will also be appreciated that by sampling the incoming sequence at less than the integer frequency i.e. by subtracting $Y.F_c/(N-1)$, at some point one of the chips will not be sampled and there will appear to be an omitted bit in the sampled sequence. Thus there will also be two correlation positions and the position of the omitted bit allows the position of the trailing edge of the chip preceding the omitted bit or the leading edge of the chip following the omitted bit to be calculated since the samples either side of the omitted bit will have been taken at the very end and at the very beginning respectively of the chips either side of the omitted chip in the transmitted sequence.

As a further enhancement, the reference register SR1 may be clocked at greater than the sampling frequency in the opposite direction to the test register SR2 (and then forwards the same number of the positions (plus one) ready for the next sample). For example, where only one extra bit is expected in the test register SR2, the reference register SR1 may be clocked at twice the sampling frequency and the mean of the sum output may be taken after adjusting for the expected value change of one unit in one of the summer outputs as a result of moving the reference register values by one position. A similar result may be achieved by clocking the reference register on the antiphase of the sampling check. This yields 2 estimates for each sample.

As yet a further enhancement, it will be appreciated that in a system where X=Y=1 then a decrease in the frequency of the sampling clock reduces the difference between the sampling period and the data frequency and hence increases the accuracy of the phase measurement. However, this would require a longer comparison length N unless it is acceptable for the extra bit to disappear from "view" in the shift register for a period of time. It is possible, however, to keep the extra bit in "view" by controlling the phase of the sampling clock. The effect is that of a relatively narrow time domain window which is tracked along the incoming sequence by adjusting the sampling clock phase. This technique is useful, for example, where a lock has been acquired on the incoming sequence and a course phase measurement made with a relatively low offset frequency sampling clock. Subsequently, the sampling difference frequency may be decreased and a more accurate phase measurement taken. This process may be repeated until phase and frequency noise in the sampling clock or received data makes further measurements impossible.

Phase control of the sampling clock may also be used in the situation where 0<Y<1. For example, where Y=½, we will see an extra sample (or omitted sample if the fraction is subtracted) in every alternate set of samples of length N. By shifting $F_s$ by 180° (i.e. 360° Y) when the extra sample is shifted out of "view" the extra sample is brought back in at the beginning of the test shift register. Otherwise, N samples would need to be taken before the extra bit appeared in the test shift register.

Thus, the difference frequency (between $F_s$ and $F_c$) may be reduced to improve accuracy but without sacrificing the number of measurements which can be made in a given time period.

Where X is greater than 1 i.e. where several samples are taken of each incoming symbol, the sequence stored in the reference register should also effectively be "sampled" with X samples per symbol. The values stored in the reference register should be the values which would be expected to be received in a noiseless environment if the incoming sequence were sampled at a frequency $X \cdot F_c$. Put simply, the values in the reference register should only differ by the presence or absence of additional or omitted bits from the values which will be placed in the test register in a noiseless environment.

Since the frequency and phase accuracy of the sampling clock limits the accuracy of the measurement, two circuits may be used to enhance accuracy. The first circuit measures the phase of the sampling clock for the second circuit. The measurement of the phase of the sampling clock is taken in relation to an incoming clock from a high quality reference. Effectively, a phase locked loop is created which accurately controls the phase of the sampling clock. The accuracy of the measurement by the second circuit is then limited only by the phase accuracy of the external reference and the response time of the phase locked loop including the first circuit.

What is claimed is:

1. Apparatus for measuring the phases of a predetermined incoming data sequence comprising:
    a sampler operable under control of a sampling clock to sample the incoming sequence,
    a tester operable to record a plurality of the samples in a time-ordered sequence,
    a reference device operable to store a copy of at least a portion of the predetermined data sequence,
    a comparator operable to compare the recorded and the stored sequences over a predetermined sequence length and to locate the position of an additional or an omitted sample in the recorded sequence,
    a calculator operable to calculate the time of sampling of the additional sample or the time of sampling of the omitted sample relative to the sampling clock, and
    an output device operable in response to the calculated time of sampling, to output a phase value indicative of the phase of the incoming sequence relative to the sampling clock.

2. Apparatus according to claim 1, wherein the sampler is operable to sample the incoming sequence at a frequency $$F_s = X \cdot F_c + \frac{Y \cdot F_c}{(N-1)}$$

where $F_c$ is the data rate, N is the predetermined length of comparison, X is the number of samples taken of each incoming symbol, where X is either an integer or the reciprocal of an integer, and Y>0 and either an integer or an integer ratio.

3. Apparatus according to claim 2, wherein the predetermined sequence is a pseudo-random bit sequence and wherein the length of the sequence is N−1.

4. Apparatus according to claim 1, wherein the sampler is operable to sample the incoming sequence at a frequency $$F_s = X \cdot F_c + \frac{Y \cdot F_c}{(N-1)}$$

where $F_c$ is the data rate, N is the predetermined length of comparison, X is the number of samples taken of each incoming symbol, where X is either an integer or the reciprocal of an integer, and Y<0 and either an integer or an integer ratio.

5. Apparatus according to claim 1, wherein the tester includes a test shift register operable to shift each successive sample received from the sampler into the register, wherein the reference device includes a register containing said predetermined digital data sequence, and wherein the comparator includes a correlator operable to perform a multiplication operation on pairs of symbols stored in corresponding positions in the two registers and to sum the result over the length of the test register.

6. Apparatus according to claim 5, wherein the calculator is operable to calculate the product of the sampling period and a value representative of said summed result to determine the calculated time of sampling in relation to the time of sampling of the first and/or last sample in the test register.

7. Apparatus according to claim 5, wherein the reference device includes a reference shift register operable to shift alternately in the same and opposite direction to the test register.

8. Apparatus according to claim 7, wherein the reference shift register is operable to shift at a frequency greater than the sampling frequency.

9. Apparatus according to claim 5, wherein the reference device includes a reference shift register operable to shift on the opposite phase of the sampling clock to the test shift register.

10. Apparatus according to claim 1, wherein the calculator is arranged to calculate the time of sampling relative to external timing reference.

11. Apparatus according to claim 10, wherein the external timing reference is a GPS 1 pps signal.

12. A method of measuring the phase of an incoming predetermined data sequence comprising:
    sampling the incoming sequence under control of a sampling clock at a frequency not equal to an integer multiple or divisor of the data rate of the sequence,
    recording a plurality of the samples in a time-ordered sequence,
    comparing the recorded sequence with a local copy of at least a portion of the predetermined data sequence and locating the position in the time-ordered sequence of an additional or omitted sample, and
    calculating the time of sampling of the additional sample or the time of sampling of the omitted sample and outputting in response to the calculated time of sampling a phase value indicative of the phase of the incoming sequence relative to the sampling clock.

13. Apparatus for measuring the phase of a predetermined incoming data sequence comprising:
    a sampler operable under control of a sampling clock to sample the incoming sequence,
    a tester operable to record a plurality of the samples in a time-ordered sequence,
    a reference device operable to a store a copy of at least a portion of the predetermined digital data sequence,
    a comparator operable to compare the recorded and the stored sequences over a predetermined sequence length and to locate the position of an additional or an omitted sample in the recorded sequence, a calculator operable to calculate the time of sampling of the additional sample or the time of sampling of the omitted sample relative to the sampling clock, and an output device operable in response to the calculated time of sampling, to output a phase value indicative of the phase of the incoming sequence relative to the sampling clock, the sampling means being operable to sample the incoming sequence at a frequency $$F_s = X \cdot F_c \pm \frac{Y \cdot F_c}{(N-1)}$$

where $F_c$ is the data rate, N is the predetermined length of comparison, X is the number of samples taken of each incoming symbol, where X is either an integer or the reciprocal of an integer, and Y is either an integer or of an integer ratio.

14. Apparatus according to claim 13, wherein the predetermined sequence is a pseudo-random bit sequence and wherein the length of the sequence is N−1.

15. Apparatus according to claim 13, wherein the tester includes a test shift register operable to shift each successive sample received from the sampler into the register, wherein the reference device includes a register containing said predetermined data sequence, and wherein the comparator includes a correlator operable to perform a multiplication operation on pairs of symbols stored in corresponding positions in the two registers and to sum the result over the length of the test register.

16. Apparatus according to claim 15, wherein the calculator is operable to calculate the product of the sampling period and a value representative of said summed result to determine the calculated time of sampling in relation to the time of sampling of the first and/or last sample in the test register.

17. Apparatus according to claim 15, wherein the reference device includes a reference shift register operable to shift alternately in the same and opposite direction to the test register.

18. Apparatus according to claim 17, wherein the reference shift register is operable to shift at a frequency greater than the sampling frequency.

19. Apparatus according to claim 15, wherein the reference device includes a reference shift register operable to shift on the opposite phase of the sampling clock to the test shift register.

20. Apparatus according to claim 13, wherein the calculator is arranged to calculate the time of sampling relative to an external timing reference.

21. Apparatus according to claim 20, wherein the external timing reference is a GPS 1 pps signal.

22. A method of measuring the phase of an incoming predetermined data sequence comprising:

sampling the incoming sequence under control of a sampling clock, recording a plurality of the samples in a time-ordered sequence, comparing the recorded sequence with a local copy of at least a portion of the predetermined data sequence and locating the position in the time-ordered sequence of an additional or omitted sample, and calculating the time of sampling of the additional sample or the time of sampling of the omitted sample and outputting in response to the calculated time of sampling a phase value indicative of the phase of the incoming sequence relative to the sampling clock, wherein the sampling is performed at a frequency $$F_s = X \cdot F_c \pm \frac{Y \cdot F_c}{(N-1)}$$

where $F_c$ is the data rate of the incoming sequence, N is the length of the time ordered sequence, X is the number of samples taken on each incoming symbol, where X is either an integer or the reciprocal of an integer, and Y is either an integer or an integer ratio.

* * * * *